United States Patent

Sugiura

[11] 3,909,690
[45] Sept. 30, 1975

[54] SELF-EXCITING DIRECT CURRENT MOTORS

[75] Inventor: Naokatsu Sugiura, Hachioji, Japan

[73] Assignee: Sansui Electric Co., Ltd., Tokyo, Japan

[22] Filed: Mar. 29, 1974

[21] Appl. No.: 456,303

[30] Foreign Application Priority Data
Mar. 31, 1973 Japan.............................. 48-36962

[52] U.S. Cl................................. 318/138; 318/254
[51] Int. Cl.² ...................................... H02K 29/00
[58] Field of Search ............ 318/138, 254, 685, 696

[56] References Cited
UNITED STATES PATENTS
3,290,572  12/1966  Hartmann et al..................... 318/138

Primary Examiner—Robert K. Schaefer
Assistant Examiner—John W. Redman
Attorney, Agent, or Firm—Harris, Kern, Wallen & Tinsley

[57] ABSTRACT

In a self-exciting direct current motor of the type including amplifier means for amplifying a position signal produced by starting position detecting means and the electromotive force induced in an armature coil wound on a magnetic pole of the stator in accordance with the rotation of the rotor, and a self-exciting circuit for supplying the output of the amplifier means to the field coil wound on the magnetic pole of the rotor as a self-excitation field current, there are provided means for detecting only the forward rotation of the rotor, means for converting the output signal of the detecting means into a continuous signal, and means for supplying the continuous signal to the self-exciting circuit at the end of a predetermined period starting with a point of time at which the signal indicating the forward rotation is detected, thereby effecting the selective operation of the self-exciting circuit so as to amplify only the voltage induced in the armature coils.

5 Claims, 8 Drawing Figures

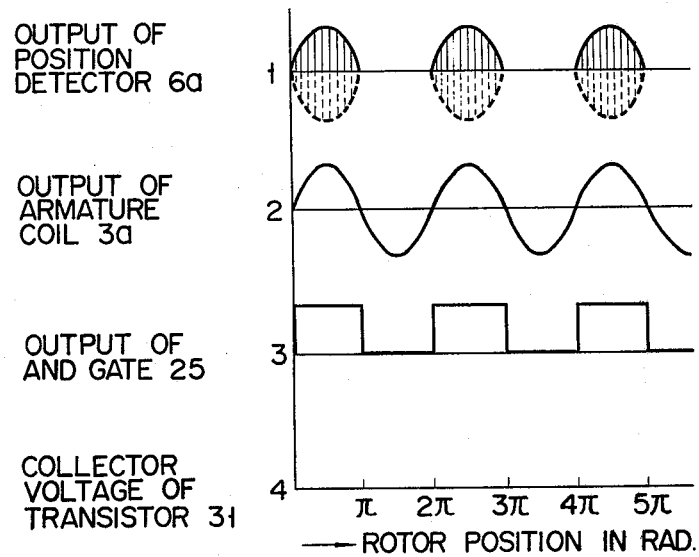
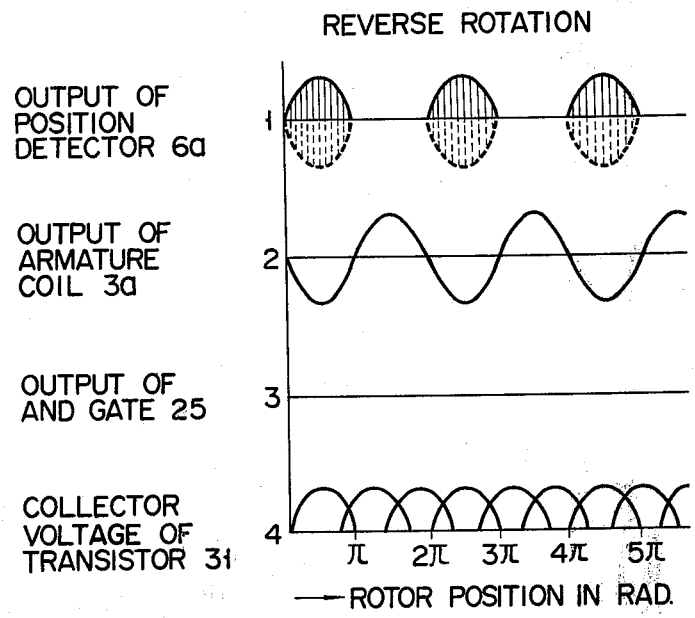

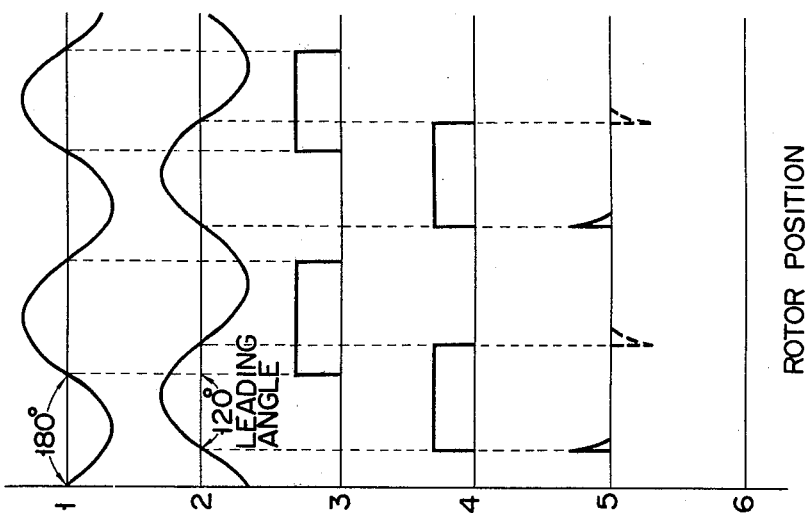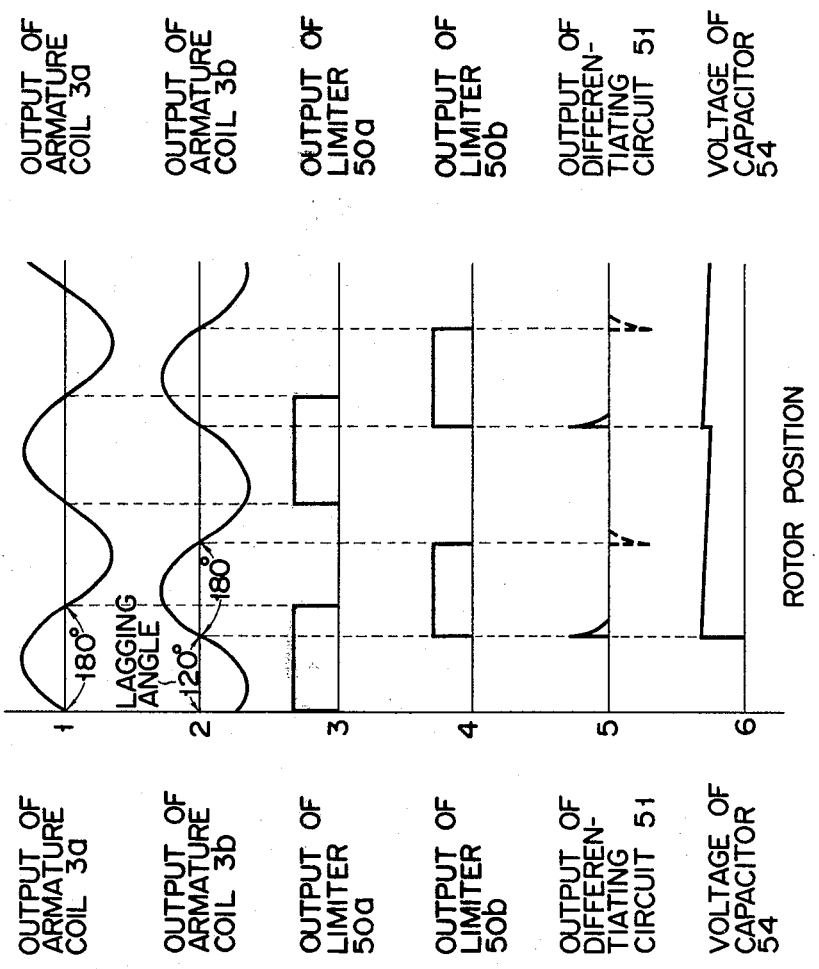

3,909,690

SELF-EXCITING DIRECT CURRENT MOTORS

BACKGROUND OF THE INVENTION

This invention relates to a self-exciting direct current motor having means for detecting the rotor angular position for starting it, and more particularly to a self-exciting direct current motor provided with means for terminating the self-excitation utilizing the output of the position detecting means a predetermined interval after starting.

A self-exciting DC motor directly coupled to the turn table of a record player, for example, to act as a low speed servo motor is generally provided with a starting control device as shown in FIG. 1. The motor comprises a rotor 1 provided with a plurality of magnetic poles in the form of a permanent magnet, and a stator 5 including a plurality of magnetic poles 4a, 4b and 4c respectively wound with field coils 2a, 2b and 2c and armature coils 3a, 3b and 3c. The start control device comprises means for detecting a starting position including a plurality of rotor angular position detecting elements 6a, 6b and 6c which detect the angular position of the rotor for producing position signals, a self-exciting circuit including amplifiers 7a, 7b and 7c for amplifying the detected position signals and the electromotive forces induced in the armature coils 3a, 3b and 3c in accordance with the rotation of the rotor so as to supply the amplified output to the field coils 2a, 2b and 2c, and a servo mechanism for regulating the field current in response to the speed of the rotor.

However, after the rotor has accelerated to a predetermined speed at which the armature coils 3a, 3b and 3c can generate outputs sufficient for the self-excitation of the field, the position detection means becomes unnecessary. Since the position detection function of the position detecting means is not so accurate as that of the outputs of the armature coils, if the amplified position signal were supplied to the field coils even after the rotor has reached a speed sufficient to provide self-excitation, the driving torque would pulsate. Such pulsation of the driving torque results in the uneven rotation of the rotor, mechanical vibrations, and noises thus causing wows and flutters in the reproduced sounds, or degrading the SN ratio thereof. Accordingly, it is desirable to terminate the supply of the position signal to the field circuit after the rotor has reached a predetermined speed.

Accordingly, it is an object of this invention to provide a self-exciting D.C. motor provided with means for terminating automatically the self-excitation caused by the output from the position detecting means a predetermined interval after starting of the motor.

SUMMARY OF THE INVENTION

According to this invention, there is provided a self-exciting direct current motor of the type comprising a rotor having a plurality of magnetic poles in the form of a permanent magnet, a stator having a plurality of magnetic poles respectively wound with field coils and armature coils, starting position detecting means including a plurality of position detecting elements to detect the angular position of the rotor for producing a position signal of the rotor, and a self-exciting circuit including amplifier means for amplifying the position signal and the electromotive forces induced in the armature coils in accordance with the rotation of the rotor for supplying the amplified power to the field coils, thus causing the rotor to rotate continuously, characterized in that there are provided means for detecting a signal indicating only the forward rotation of the rotor, means for converting the output of the signal detecting means into a continuous signal, and means for supplying the continuous signal to the self-exciting circuit at the end of a predetermined period starting with a point of time at which the signal indicating the foward rotations is detected, thereby effecting the selective operation of the self-exciting circuit so as to amplify only the voltage induced in the armature coils.

The signal indicating only the forward rotation of the rotor can be obtained by detecting the phase coincidence of the positive half cycles of the output of one of the position detecting elements and of the positive half cycles of the output from a corresponding armature coil at the time of forward rotation, or by detecting the outputs of two armature coils which generate outputs having a predetermined phase relationship at the time of forward rotation. It is possible to terminate the operation of the position detecting means after said predetermined period. Alternatively, it is also possible to use the output of the position detecting means for controlling the field current.

BRIEF DESCRIPTION OF THE DRAWINGS

FIGS. 3A and 3B show voltage and current waveforms helpful to explain the operation of this invention;

FIGS. 6A and 6B are voltage and current waveforms helpful to explain the operation of the embodiment shown in FIG. 5 during forward rotation and reverse rotation, respectively.

DESCRIPTION OF THE PREFERRED EMBODIMENTS

Figure 1:
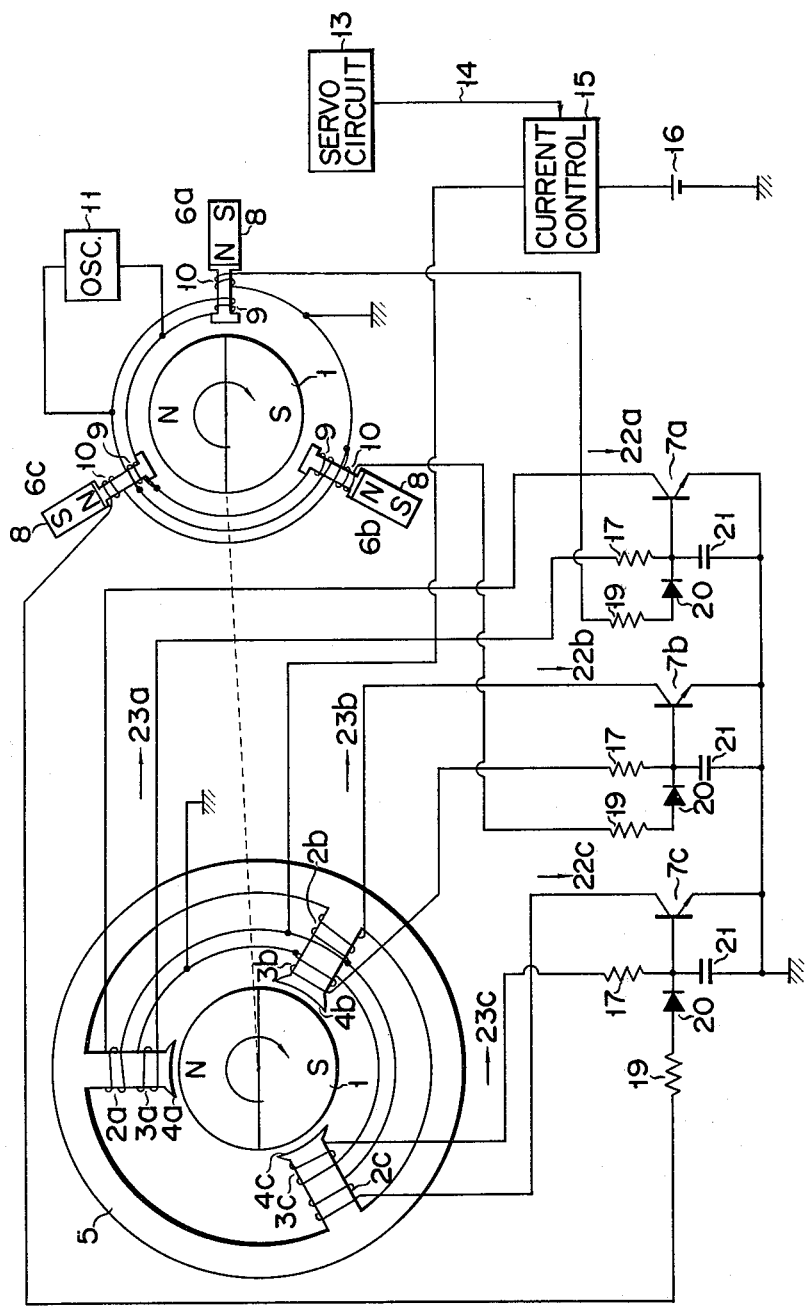
FIG. 1 is a connection diagram of a prior art self-exciting DC motor.
Figure 2:
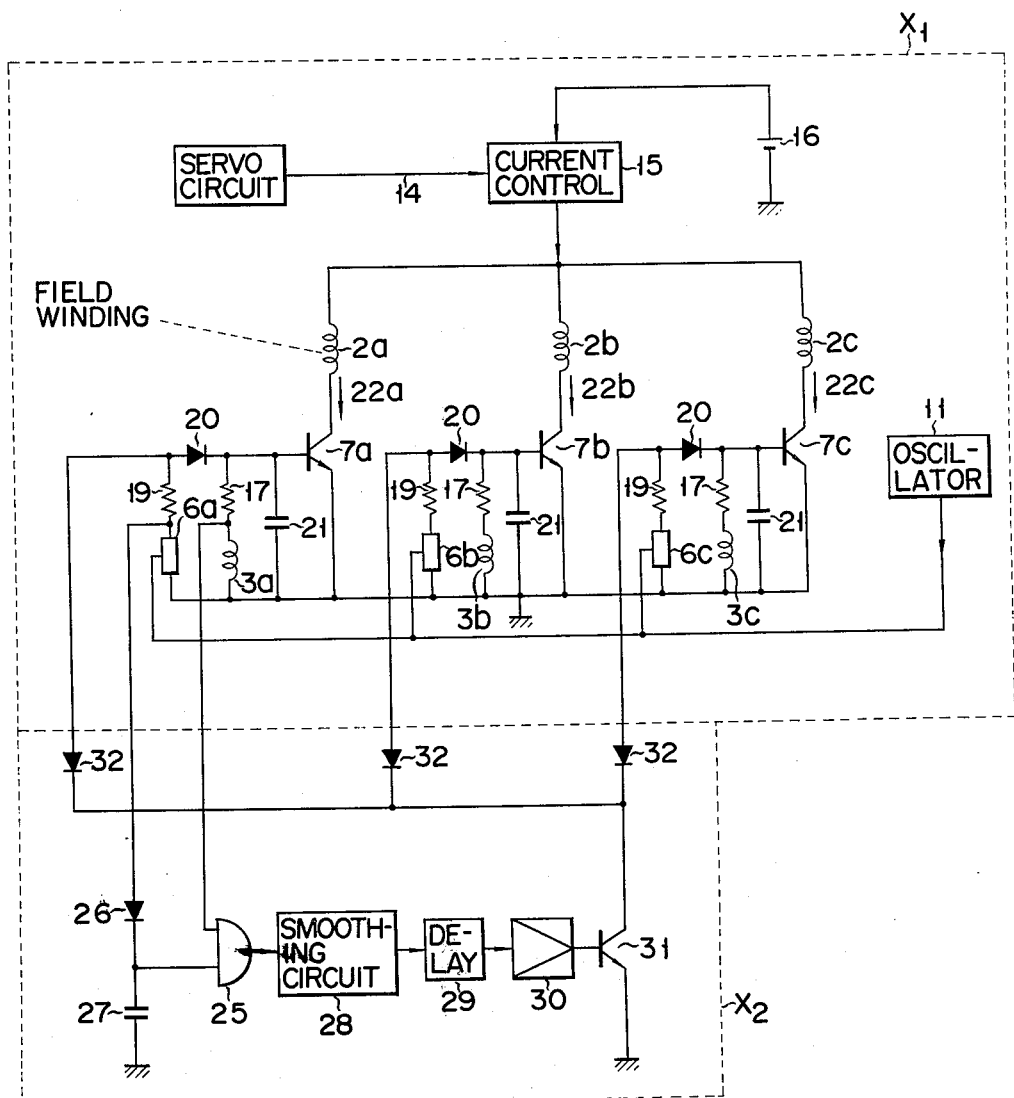
FIG. 2 shows a connection diagram of one embodiment of this invention.

Referring now to FIG. 2, the elements contained in a dotted line block X1 are the same as those shown in FIG. 1 so that they are designated by the same reference numerals. As best shown in FIG. 1 the starting position detecting elements 6a, 6b and 6c are supported by the stator 5 at an equal spacing about an extension of the shaft of the rotor 1. In this embodiment, the pole pieces 4a, 4b and 4c are shown to correspond to the position detecting elements 6a, 6b and 6c, respectively, and the position detecting element 6a is shown at a position 90° advanced than the corresponding stator magnetic pole 4a in the direction of the forward rotation.

Each position detecting element is shown as comprising a magnetic modulator comprising a magnetic core magnetically saturated by the flux of a biasing permanent magnet 8, and high frequency coils 9 and 10 wound on the core. Each coil 9 is energized by a high frequency oscillator 11 and one terminals of the coils 10 are grounded. The position detecting elements are constructed such that the magnetic core of only the detecting element which is opposing to the N pole of the rotor is demagnetized.

A servo circuit 13 is constructed such that it detects the rotary speed of the rotor 1 from the electromotive forces induced in the armature coils 3a, 3b and 3c, for supplying a servo signal 14 corresponding to the rotary speed to a current control element 15. Current from a DC source 16 is controlled by the current control element 15 and then supplied to respective field coils 2a, 2b and 2c.

One terminals of the field coils 2a, 2b and 2c are connected to the collector electrodes of amplifying transistors 7a, 7b and 7c, whereas the other terminals are commonly connected to the output terminal of the current control element 15. The emitter electrodes of these amplifying transistors are commonly connected to the grounded negative terminal of source 16. One terminals of the armature coils 3a, 3b and 3c are connected to the base electrodes of the corresponding amplifying transistors respectively through resistors 17, whereas the other terminals are grounded. One terminal of the coil 10 of each position detecting element is connected to the base electrode of the corresponding amplifying transistor through serially connected resistor 19 and a diode 20 whereas the other terminal of the coil 10 is grounded. A smoothing capacitor 21 is connected across the base and emitter electrodes of each amplifying transistor.

Field coils 2a, 2b and 2c are wound such that when field currents 22a, 22b and 22c flow therethrough in the directions of arrows they will form N poles on the inner ends of respective magnetic poles 4a, 4b and 4c. The armature coils 3a, 3b and 3c are wound such that when the rotor is rotated in the direction of arrows, which is the forward direction in this embodiment, the polarity of the magnetic pole changes from N to S so that they will induce electromotive forces 23a, 23b and 23c in the direction of arrows due to the flux change.

Although the output from the coil 10 of each one of the position detecting elements 6a, 6b and 6c varies in the positive and negative directions, its positive half cycle output is rectified by diode 20 and the rectified power is applied to the base electrode of the corresponding transistor.

The circuit included in a dotted line block X2 shown in FIG. 2 is constructed as follows. Thus, a voltage at the junction between the output terminal of one of the position detecting elements, for example, element 6a, and a resistor 19 is applied to one input of an AND gate circuit 25 through a diode 26, whereas the voltage at the junction between armature coil 3a confronting the position detecting element 6a and a resistor 17 is applied to the other input of the AND gate circuit 25. The negative electrode of diode 26 is grounded through a capacitor 27. The output from the AND gate circuit 25 is smoothed by a smoothing circuit 28 so as to produce a continuous signal. Since the interval between the instant at which the rotor is started in the forward direction and the instant at which above described self-excitation becomes effective is constant a delay circuit 29 is provided for delaying the output from the smoothing circuit 28 for this interval. After being amplified by an amplifier 30, the output of the delay circuit 29 is applied to the base electrode of a switching transistor 31. The junctions between respective resistors 19 and diodes 20 are connected to the collector electrode of the switching transistor 31 respectively through diodes 32, while the emitter electrode of transistor 31 is grounded.

The operation of the circuit shown in the block X1 in FIG. 2, that is the circuit shown in FIG. 1, will firstly be described. At start, the servo signal 14 generated by the servo circuit 13 operates the current control element 15. Then the positive half cycles of the position signal generated by the coil 10 of a position detecting element confronting the N pole of the rotor 1 at this time are rectified by a diode 20 and amplified by a corresponding one of amplifying transistors 7a, 7b and 7c. The output of the amplifying transistor is supplied to the corresponding one of the field coils 2a, 2b and 2c thus starting the rotation of the rotor. Then electromotive forces are induced in the armature coils. As the rotor rotates, the outputs of the corresponding position detecting element and the armature coil are amplified by the corresponding amplifying transistor, thus gradually accelerating the rotor until a predetermined constant speed is reached under the command of the servo signal 14.

Figure 4:
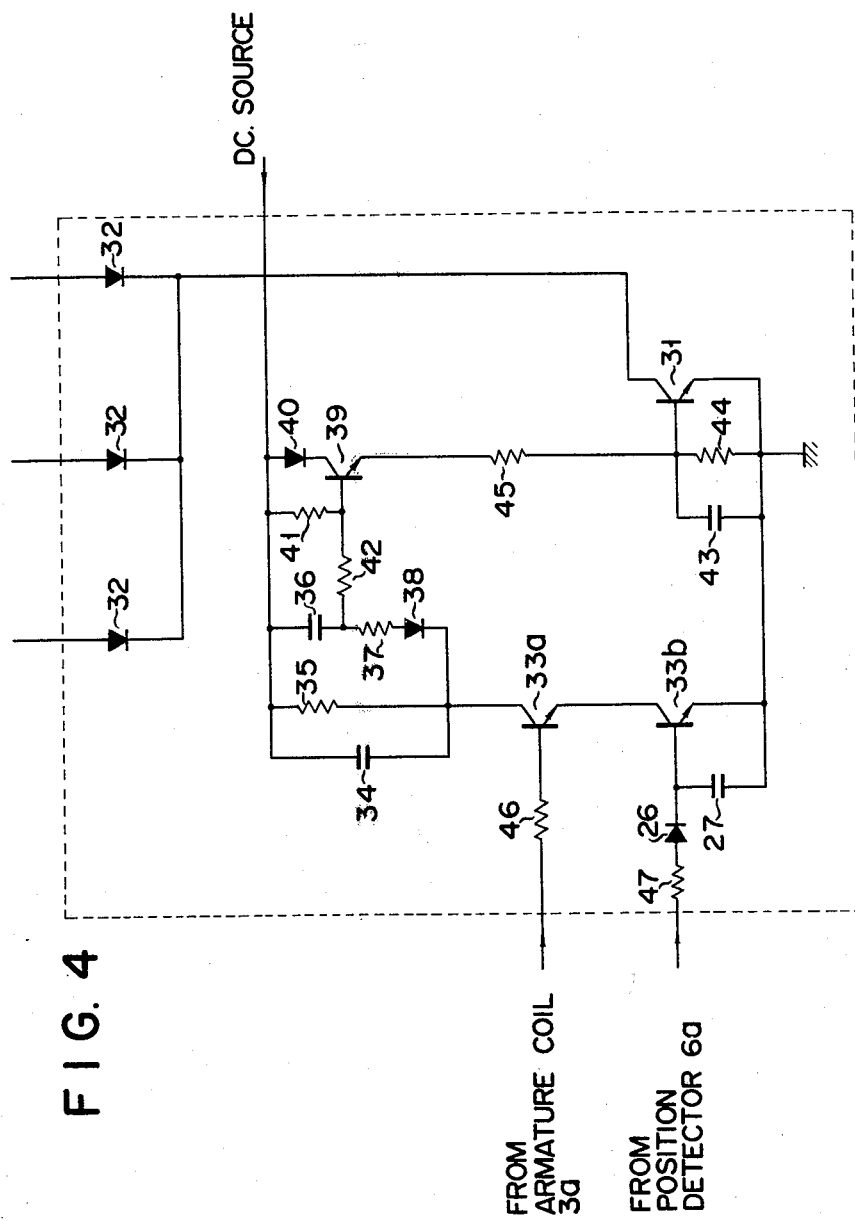
FIG. 4 shows a modification of the portions contained in a dotted line block shown in FIG. 2.

The operation of the circuit shown in the block X2, FIG. 2, will now be described. It is now assumed that the output or the position signal of the position detecting element 6a, for example, is generated at the rotor positions 0-$\pi$, 2$\pi$-3$\pi$, ... as shown in FIG. 3A. This position signal is a high frequency signal and the positive half cycles thereof shown in FIG. 3A-1 are rectified by diode 26 to be used as one input to the AND gate circuit 25. When the rotor 1 rotates in the forward direction as shown by the arrow, the armature coil 3a corresponding to the position detecting element 6c produces an output having a phase as shown by FIG. 3A-2 and applied to the other input of the AND gate circuit 25. As a result this gate circuit 25 produces output pulses as shown by FIG. 3A-3, which are converted into a continuous signal by the smoothing circuit 28. This continuous signal is delayed a definite time by the action of delay circuit 29 and then amplified by amplifier 30 thereby continuously rendering ON the switching transistor 31. Thus, the collector of this transistor 31 is continuously maintained at the ground potential as shown by FIG. 3A-4. In other words, the junctions between resistors 19 and diodes 20 are also grounded whereby the positive half cycle outputs of respective position detection elements will not be applied to the base electrodes of respective amplifying transistors 7a, 7b and 7c. However, since the voltage at the junction between the resistor 19 and the position detecting element 6a, or the positive half cycle output of the element 6a is applied to one input of the AND gate circuit 25, it still produces the pulse shown in FIG. 3A-3.

If a reverse torque is applied to the rotor by an external force, although the position detecting element 6a produces an output having the same phase as that of the output during the forward rotation, as shown in FIG. 3B-1, the phase of the output of the armature coil 3a will be opposite to that of the output during forward rotation as shown in FIG. 3B-2. In this manner, since the positive half cycle outputs of the position detecting element 6a and the armature coil 3a are not in-phase, the output of the AND gate circuit 25 becomes zero as shown in FIG. 3B-3, thus rendering OFF the switching transistor 31. Accordingly, the outputs of respective position detecting elements 6a, 6b and 6c are applied to the base electrodes of amplifying transistors 7a, 7b and 7c respectively to drive the rotor in the forward direction. The waveform of the collector voltage of the switching transistor 31 under these conditions is shown by FIG. 3B-4.

FIG. 4 shows a modification of the circuit in the block X2 shown in FIG. 2. This modified circuit comprises an AND gate circuit consisting of transistors 33a and 33b; a smoothing circuit consisting of a capacitor 34 and a resistor 35; a delay circuit consisting of a capacitor 36, a resistor 37 and a diode 38; an amplifier consisting of a transistor 39, a diode 40, and resistors 41 and 42; a switching transistor 31, a capacitor 43, resistors, 44, 45, 46 and 47, and diodes 26 and 32.

Figure 5:
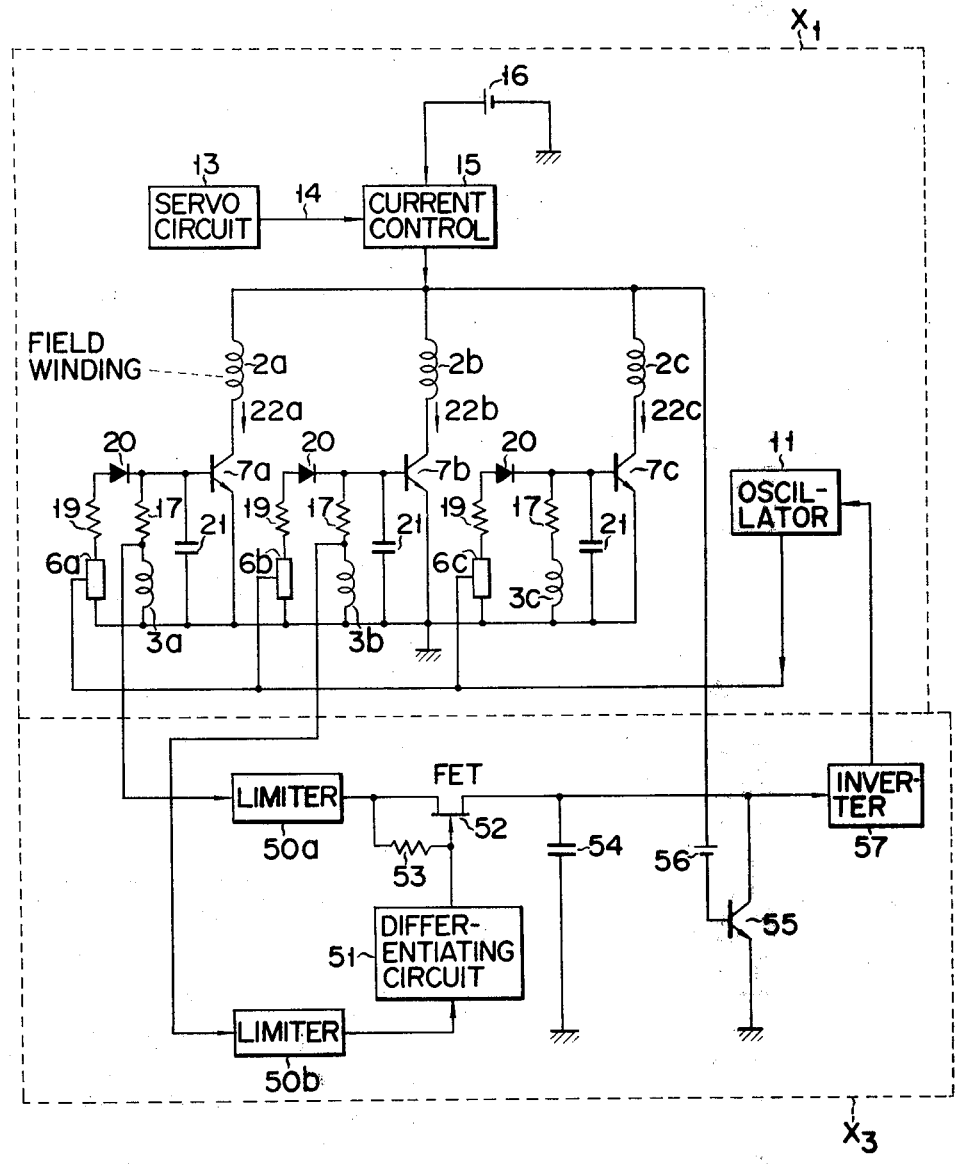
FIG. 5 is a connection diagram showing a modified embodiment of this invention.

In the modification shown in FIG. 5, a signal indicating the forward rotation of the rotor is generated by two armature coils which produce outputs having a predetermined phase relationship. This modification is also constructed to terminate the operation of the position detecting means a predetermined interval after starting.

The circuit shown in the block X1 is identical to that shown in FIG. 2 so that the elements of the circuit are designated by the same reference numerals. The circuit included in block X3 comprises a first limiter 50a which is connected to the junction between resistor 17 and armature coil 3a for producing a rectangular wave (FIG. 6A-3) having the same phase as the positive half cycles (FIG. 6A-1) of the output of the armature coil 3a during forward rotation, and a second limiter 50b connected to the junction between resistor 17 and armature coil 3b which produces an output 120° dephased from that of the armature coil 3a for producing a rectangular wave (FIG. 6B-4) having the same phase as that of the positive half cycle output of the armature coil 3b. The output from the second limiter 50b is differentiated by a differentiating circuit 51 to produce a differentiated output (FIG. 6A-5). The positive component of this output shown by the solid lines is applied to the gate electrode of a field effect transistor FET, whereas the output of the first limiter 50a is applied to the source electrode of the field effect transistor. A bias resistor 53 is connected between the source and gate electrodes. Each time the rectangular wave output (FIG. 6A-3) from the first limiter 50a and the positive differentiated output (FIG. 6A-5) appear simultaneously, a pulse is produced at the drain electrode of the field effect transistor 52 and these pulses are stored in a voltage storing circuit in the form of a capacitor 54, to form a step-shaped continuous voltage (FIG. 6A-6).

Across capacitor 54 are connected the collector and emitter electrodes of an NPN switching transistor 55 with its base electrode connected to the output terminal of the current control element 15 via a DC source 56 poled as shown. The non-grounded terminal of capacitor 54 is connected to a source switch (not shown) of the high frequency oscillator 11 via an inverter 57. The high frequency oscillator 11 is constructed such that it oscillates when the output from inverter 57 is "1" whereas it stops oscillation when the output of inverter 57 is "0".

The current control element 15 is controlled by the servo signal 14 provided by the servo circuit 13 such that it produces the full voltage of source 16 at its output terminal at the time of initiating starting. Assuming that the motor runs at a speed of 33 r.p.m. during normal operation, when the motor accelerates to a speed close to 33 r.p.m. a predetermined time after starting, the output voltage of the current control element 15 is reduced to a fraction of the output voltage at the time of starting. For this reason, the voltage of the source 56 is proportioned such that the switching transistor 55 is maintained in the conductive state until the output of the current control element 15 is reduced to the fraction and that the transistor 55 is rendered OFF at that time. Since the value of the output voltage from the current control element 15 when the motor accelerates substantially to the normal speed after starting can be readily predetermined, the voltage of the source 56 can also be predetermined.

The circuit shown in FIG. 5 operates as follows. During forward rotation, the voltage across capacitor 54 is maintained substantially constant as described above since switching transistor 55 is maintained conductive until the rotor accelerates to a speed close to the normal speed the inverter 57 produces an output "1" whereby the oscillator 11 continues to oscillate. The oscillation output of oscillator provides a self-excitation to the motor. When the motor reaches the normal speed, switching transistor 55 is rendered OFF so that the voltage across capacitor 54 is applied to inverter 57 causing it to produce an output "0." Accordingly, the oscillation of the oscillator 11 is terminated.

As can be noted from FIG. 6A, when the rectangular wave (FIG. 6A-3) produced by the first limiter 5a and the positive pulse (FIG. 6A-5) produced by the differentiating circuit 51 are present simultaneously, a forward rotation signal can be detected. From this it will be clear that respective limiters may be connected to one armature coil and to another armature coil which produces an output whose positive half cycles lag less than 180° than the positive half cycles of the output of said one armature coil during forward rotation.

When a reverse torque is applied to the rotor by an external force, the positive half cycles of the output of armature coil 3b (FIG. 6B-2) advance 120° than the positive half cycles of the output of the armature coil 3a (FIG. 6B-1). Accordingly, the positive pulse produced by the differentiating circuit 51 (FIG. 6B-5) does not occur during the square wave output produced by the first limiter 50a, so that capacitor 54 will not be charged by the output of the field effect transistor 52. Accordingly, the inverter produces an output "1" and the oscillator 11 continues to oscillate to apply a signal to the amplifier 7 for rotating the rotor in the forward direction. According to this embodiment, it is possible to detect the direction of rotation of the rotor unless two armature coils that produce outputs which are in phase or opposite phase are used.

While the invention has been shown and described in terms of specific embodiments thereof it will be clear that the invention is by no means limited to these specific embodiments. For example, the number of phases is not limited to three and it is clear that other types of position detecting means can also be used.

What is claimed is:

1. In a self-exciting direct current motor of the type comprising a rotor having a plurality of magnetic poles in the form of a permanent magnet, a stator positioned about said rotor and having a plurality of magnetic poles respectively wound with field coils and armature coils, starting position detecting means positioned adjacent said rotor and including a plurality of position detecting elements to detect the angular position of the rotor for producing a position signal of the rotor, a selfexciting circuit including amplifier means for amplifying said position signal and the electromotive forces induced in said armature coils in accordance with the rotation of said rotor for supplying the amplified power to said field coils thus causing the rotor to rotate continuously, and means for connecting a position signal and an armature coil to an amplifier means as inputs and for connecting an amplifier means output to a field coil, the improvement which comprises:

means having an armature coil as an input for detecting a signal indicating only the forward rotation of said rotor and providing an output;

means for converting the output of said signal detecting means into a continuous signal; and means for supplying said continuous signal to said self-exciting circuit at the end of a predetermined period starting with a point of time at which the signal indicating said forward rotation is detected, thereby effecting the selective operation of said self-exciting circuit so as to amplify only the voltage induced in said armature coils.

2. A self-exciting direct current motor according to claim 1 wherein said means for detecting a signal indicating only the forward rotation comprises an AND gate circuit which detects the phase coincidence of the positive half cycles of the output of one of said position detecting elements and the positive half cycles of the output of one armature coil corresponding to said one position detecting element, said means for converting the output of said signal detecting means into said continuous signal comprises a smoothing circuit for smoothing the output of said AND gate circuit, and means for effecting said selective operation comprises a delay circuit for delaying the output of said smoothing circuit for said predetermined period, and means responsive to the output of said delay circuit for preventing from amplifying the positive half cycles of the outputs of said position detecting elements and for continuing the supply of said positive half cycles to said AND gate circuit.

3. A self-exciting direct current motor according to claim 2 wherein said means for preventing from amplifying the positive half cycles of the outputs of said position detecting elements and for continuing the supply of said positive half cycles comprises input resistors for applying the positive half cycles of the outputs of the respective position detecting elements to the input of said amplifier means through diodes, means for bypassing said positive half-cycles from the junctions between the respective input resistors and the respective diodes through a circuit including other diodes and a switching element, means responsive to the output of said delay circuit for maintaining said switching element in its conductive state, and means for supplying the positive half cycle output at the junction between one of said position detecting elements and one of said input resistors to one input of said AND gate circuit through a diode.

4. A self-exciting direct current motor according to claim 1 wherein said means for detecting a signal indicating only the forward rotation of the rotor comprises a forward rotation detecting circuit responsive to the output voltage of the first one of said armature coils and the output voltage of the second one of said armature coils which lags less than 180 electrical degrees than the output voltage of said first armature coil for producing output pulses indicating the forward rotation, means for converting said output pulses into a continuous signal, and means for supplying said continuous signal to said starting position detecting means for terminating the operation thereof after said predetermined period.

5. A self-exciting direct current motor according to claim 4 wherein said forward rotation detecting circuit comprises a first limiter which produces a rectangular wave in phase coincidence with the positive half cycles of the output of said first armature coil, a second limiter which produces a rectangular wave in phase coincidence with positive half cycles of the output of said second armature coil, a circuit for differentiating the output of said second limiter, and means for producing an output pulse each time when the positive pulse output of said differentiating circuit and the output of said first limiter occur simultaneously.

\* \* \* \* \*

UNITED STATES PATENT AND TRADEMARK OFFICE
CERTIFICATE OF CORRECTION

PATENT NO. : 3,909,690
DATED : September 30, 1975
INVENTOR(S) : NAOKATSU SUGIURA It is certified that error appears in the above—identified patent and that said Letters Patent are hereby corrected as shown below:

[30] Foreign Application Priority Data

"Mar. 31, 1973 Japan ............48-36962"

Should be

--Mar. 31, 1973 Japan .........36962/73 and

Apr. 4, 1973 Japan .........38481/73--

Signed and Sealed this seventeenth Day of February 1976

[SEAL]

Attest:

RUTH C. MASON
*Attesting Officer*

C. MARSHALL DANN
*Commissioner of Patents and Trademarks*